United States Patent
Martin et al.

(10) Patent No.: US 11,210,757 B2
(45) Date of Patent: Dec. 28, 2021

(54) GPU PACKET AGGREGATION SYSTEM

(71) Applicant: ADVANCED MICRO DEVICES, INC., Santa Clara, CA (US)

(72) Inventors: Todd Martin, Orlando, FL (US); Tad Litwiller, Orlando, FL (US); Nishank Pathak, Orlando, FL (US); Mangesh P. Nijasure, Orlando, FL (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 16/713,472

(22) Filed: Dec. 13, 2019

(65) Prior Publication Data
US 2021/0183004 A1    Jun. 17, 2021

(51) Int. Cl.
*G06T 1/20*    (2006.01)
*H04L 12/863*    (2013.01)
*H04L 12/861*    (2013.01)

(52) U.S. Cl.
CPC ............ *G06T 1/20* (2013.01); *H04L 47/6255* (2013.01); *H04L 49/9057* (2013.01); *H04L 2212/00* (2013.01)

(58) Field of Classification Search
CPC ... G06T 1/20; H04L 49/9057; H04L 47/6255; H04L 2212/00
See application file for complete search history.

(56) References Cited

U.S. PATENT DOCUMENTS

| | | | |
|---|---|---|---|
| 7,209,139 B1 * | 4/2007 | Keet | G06T 15/005 345/419 |
| 7,839,876 B1 | 11/2010 | Goel et al. | |
| 9,509,616 B1 * | 11/2016 | Judge | H04L 47/125 |
| 2005/0249231 A1 * | 11/2005 | Khan | H04N 21/434 370/428 |
| 2013/0162661 A1 * | 6/2013 | Bolz | G06F 9/3836 345/522 |
| 2016/0283416 A1 | 9/2016 | Ha et al. | |
| 2016/0352598 A1 | 12/2016 | Reinhardt et al. | |
| 2016/0379336 A1 | 12/2016 | Tsai et al. | |
| 2017/0123866 A1 | 5/2017 | Indeck et al. | |

OTHER PUBLICATIONS

U.S. Appl. No. 16/580,654, filed Sep. 24, 2019, listing Michael Mantor et al. as inventors, entitled "Exception Handler for Sampling Draw Dispatch Identifiers", 25 pages.
International Search Report and Written Opinion dated Mar. 29, 2021 for PCT/US2020/063923, 10 pages.

* cited by examiner

*Primary Examiner* — Sing-Wai Wu

(57) ABSTRACT

A graphics processing unit (GPU) includes a packet management component that automatically aggregates data from input packets. In response to determining that a received first input packet does not indicate a send condition, and in response to determining that a generated output packet would be smaller than an output size threshold, the packet management component aggregates data corresponding to the first input packet with data corresponding to a second input packet stored at a packet buffer. In response to determining that a received third input packet indicates a send condition, the packet management component sends the aggregated data to a compute unit in an output packet and performs an operation indicated by the send condition.

20 Claims, 4 Drawing Sheets

GPU PACKET AGGREGATION SYSTEM

BACKGROUND

Processors often employ multiple modules, referred to as compute units (CUs), to execute operations in parallel. For example, a processor employs a graphics processing unit (GPU) to carry out a variety of image processing or other general-purpose processing applications. To support efficient execution of these operations, the GPU includes multiple CUs to execute the operations in parallel. However, in some cases, communication of data used to perform these operations impacts the overall efficiency of the processor. For example, in some cases, indices for the graphics and vector processing operations are sent to the CUs via a communication fabric, such as a bus. In some situations, the communication traffic supporting these data transfers consumes an undesirably large portion of the communication fabric's available bandwidth, thereby reducing overall processing efficiency at the GPU.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

As described herein, in various embodiments, a packet management component of a packet aggregation system of a processing unit such as a graphics processing unit (GPU) aggregates data from incoming packets in response to detecting that an output wavefront will be smaller than an output size threshold. In response to detecting a send condition (e.g., an incoming packet indicates a context switch or data has been stored or held at the packet management component for a particular amount of time) or other output condition, the packet management component outputs the aggregated data as a wavefront. As a result, communication infrastructure is more efficiently used, as compared to a system where data is not aggregated. Further, in some cases, the output conditions are difficult for software systems (e.g., drivers) to detect in a timely manner because of the number of input packets and because of a time lag due to software processing. In the described embodiments, because the described systems detect output conditions at the hardware level as input packets are received, the system more easily detects output conditions, as compared to a system where a software driver aggregates the data.

To illustrate, GPUs and other multithreaded processing units typically implement multiple processing elements (which are also referred to as processor cores or compute units) that concurrently execute sets of instructions or operations on multiple data sets. The sets of instructions or operations are referred to as threads. Operations and program data for the threads is sent to the processing elements by a command processor via communications referred to as packets. In some embodiments, such as graphics systems, the packets are collections of graphics data referred to as wavefronts.

In some cases, communication of wavefronts (or other packets) is hardware inefficient. For example, if a program calls for a large number of wavefronts (e.g., draws) that each have only a few indices (e.g., one or five indices), the resulting wavefronts would each inefficiently utilize communication infrastructure designed to send wavefronts that include more indices (e.g., a 32-wide infrastructure or a 256-wide communication infrastructure). In various embodiments, indices refer to values generated by a user that provide locations of vertex coordinates. In some cases, an incoming packet includes more data than can be communicated in a single wavefront but not enough data for a last wavefront generated based on the packet to efficiently use communication infrastructure. Further, in some cases where a software driver is used to aggregate wavefront data, it is difficult for the software to detect output conditions (e.g., register state updates, pipeline flushes, or context switches) due to a quantity of the wavefronts.

Figure 1:
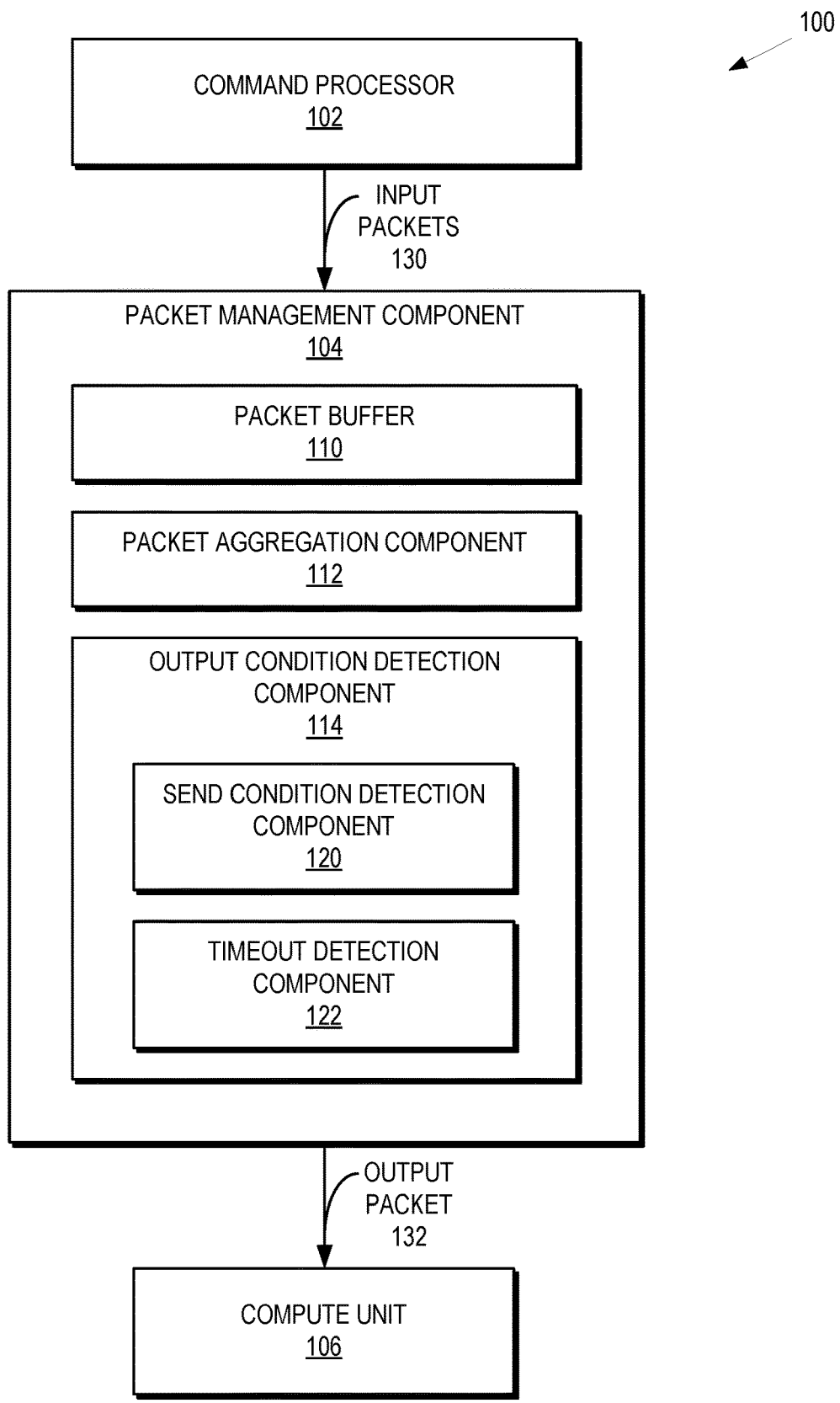
FIG. 1 is a block diagram of a graphics processing unit including hardware that automatically aggregates data from input packets in accordance with some embodiments.

FIG. 1 is a block diagram of a graphics processing unit (GPU) 100 including hardware that automatically aggregates data from input packets in accordance with some embodiments. In the illustrated embodiment, GPU 100 includes command processor 102, packet management component 104, and compute unit 106. Packet management component 104 includes packet buffer 110, packet aggregation component 112, and output condition detection component 114. Output condition detection component 114 includes send condition detection component 120 and timeout detection component 122. However, in other embodiments, other structural arrangements (e.g., additional components or fewer components) are contemplated. For example, in some embodiments, send condition detection component 120 includes timeout detection component 122. In other embodiments, timeout detection component 122 is separate from output condition detection component 114. Further, although only a single compute unit 106 is illustrated for clarity reasons, in various embodiments, GPU 100 includes a plurality of compute units.

In some embodiments, GPU 100 is part of a device such as a desktop or laptop computer, server, smartphone, tablet, game console, or other electronic device. The device includes a central processing unit (CPU) that sends various commands or instructions (e.g., draw commands) to GPU 100.

In the illustrated embodiment, GPU 100 executes various operations. These operations include program calls that call for data to be processed. As a result, command processor 102 sends various input packets 130 to packet management component 104 where input packets indicate various sets of commands from GPU 100 based on the program calls. In various embodiments, input packets 130 include various types of data including draw indices or indications of send conditions (e.g., indications of events that would cause packet management component 104 to output data to the one or more compute units). In some embodiments, input packets 130 are sent sequentially over a period of time. Packet management component generates output packet 132 based on data from input packets 130. In response to an output packet being smaller than a an output size threshold (e.g., because an input packet includes less data than an amount used to generate a packet of the output size threshold or because an input packet includes enough data that multiple output packets are generated and a last output packet would be smaller than the output size threshold), packet management component 104 holds and aggregates data corresponding to one or more input packets of input packets 130 and outputs the aggregated data as output packet 132 to one or more compute units such as compute unit 106. In some embodiments, output packet 132 is sent to each of the plurality of compute units or different output packets are sent to respective compute units. In some embodiments, the aggregated output packet is sent as if it were the first received input packet included in the aggregated output packet (e.g., including various headers and other data corresponding to the first received input packet). In other embodiments, the aggregated output packet is sent as if it were a different received input packet, the aggregated output packet is indicative of multiple received input packets, or the aggregated output packet is indicative of none of the received input packets.

More specifically, in response to receiving one or more of input packets 130, packet management component 104 analyzes the received input packets. In response to detecting, based on send condition detection component 120, that an input packet does not indicate a send condition, packet management component 104, using packet aggregation component 112, aggregates data corresponding to the input packet in packet buffer 110. For example, packet aggregation component 112 aggregates data corresponding to an incoming input packet with previously stored data in packet buffer 110. In some embodiments, the data is the entire input packet. In other embodiments, the data is a portion of the input packet, data indicated by the input packet (e.g., data generated as a result of one or more computations indicated by the input packet), or both. In response to detecting, using send condition detection component 120, that an input packet indicates a send condition, packet management component 104 sends the aggregated data to one or more compute units such as compute unit 106 in output packet 132. Accordingly, fewer output packets 132 are sent to compute unit 106, as compared to a system where an output packet is sent for each input packet. In some embodiments, input packets 130 are indices of draw commands and output packet 132 is a wavefront including indices corresponding to multiple input packets of input packets 130. In some embodiments, send condition detection component 120 only determines whether the input packet indicates a send condition in response to detecting that the output packet would be smaller than an output size threshold. In other embodiments, send condition detection component 120 detects various send conditions in parallel with detecting whether the output packet would be smaller than the output size threshold.

Various output conditions that cause packet management component 104 to send output packet 132 to compute unit 106 are contemplated. In some embodiments, output conditions include send conditions (e.g., conditions indicated by incoming packets), timeout conditions, and size conditions. Accordingly, output condition detection component 114 includes various hardware such as buffers and read enable logic to detect various output conditions. In the illustrated embodiment, some output conditions are send conditions indicated by an input packet of input packets 130. To provide a few examples, in some cases, state information of an input packet indicates a register state update (e.g., a packet specifying a draw topology, controlling a distribution of a draw workload, or specifying a number of bits of an index type) or an event (e.g., a pipeline flush (a process where instructions in a pipeline are removed, for example, due to an incorrect branch prediction) or a context switch (a switch between two applications, tasks, or programs)). Further, in some cases, output conditions include changing a draw source (e.g., from direct memory access to auto index or vice versa), changing virtual reality control fields, or changing an index size between draws. However, other output conditions, including those detected by various other means, are also contemplated.

In some cases, an output condition includes timeout detection component 122 indicating that a packet storage timer of timeout detection component 122 exceeds a timeout threshold. For example, in some embodiments, the packet storage timer tracks an amount of time at least some data has been stored at packet buffer 110 (e.g., the data stored the longest). In response to the amount of time exceeding a timeout threshold (e.g., 50 clock cycles or 1 microsecond), timeout detection component 122 indicates an output condition. In some cases, the timeout threshold is user-specified. In other cases, the timeout threshold is specified by another entity such as an application running on GPU 100.

In some cases, data stored or otherwise held at packet buffer 110 exceeds a capacity of a communication infrastructure between packet management component 104 and compute unit 106. Accordingly, an output packet could efficiently utilize the communication infrastructure. Therefore, in some embodiments, an output condition includes determining that an amount of the aggregated data stored at packet buffer 110 exceeds an output size threshold. In some embodiments, the output size threshold is user specified. In some embodiments, the output size threshold corresponds to a size of a communication infrastructure used to send output packet 132 to compute unit 106. To illustrate, if the communication infrastructure is 32-wide, then detecting that packet buffer stores more than 31 indices causes output condition detection component 114 to indicate that an output condition is satisfied.

Various manners of aggregating the data of input packets 130 are contemplated. For example, in one embodiment, packet aggregation component 112 causes packet buffer 110 to store the data of input packets 130 separated by respective delimiters. As another example, in another embodiment, aggregating the data of input packets 130 includes updating a header file stored at packet buffer 110 to indicate addresses corresponding to respective input packets of input packets 130. In some embodiments, input packets 130 in their entirety are stored or otherwise held at packet buffer 110. In other embodiments, only a portion of input packets 130 are stored or otherwise held at packet buffer 110.

Accordingly, a system is disclosed where packets (e.g., draw indices) are automatically aggregated (e.g., without specific software instructions with regard to the packets) by hardware components. In some embodiments, the system aggregates the packets without software management. Further, the system detects various output conditions (e.g., register state updates and events) and sends aggregated packets in response to the output conditions. By automatically detecting output conditions, the system supports efficient packet aggregation without demanding software intervention or redesign of legacy software.

Figure 2:
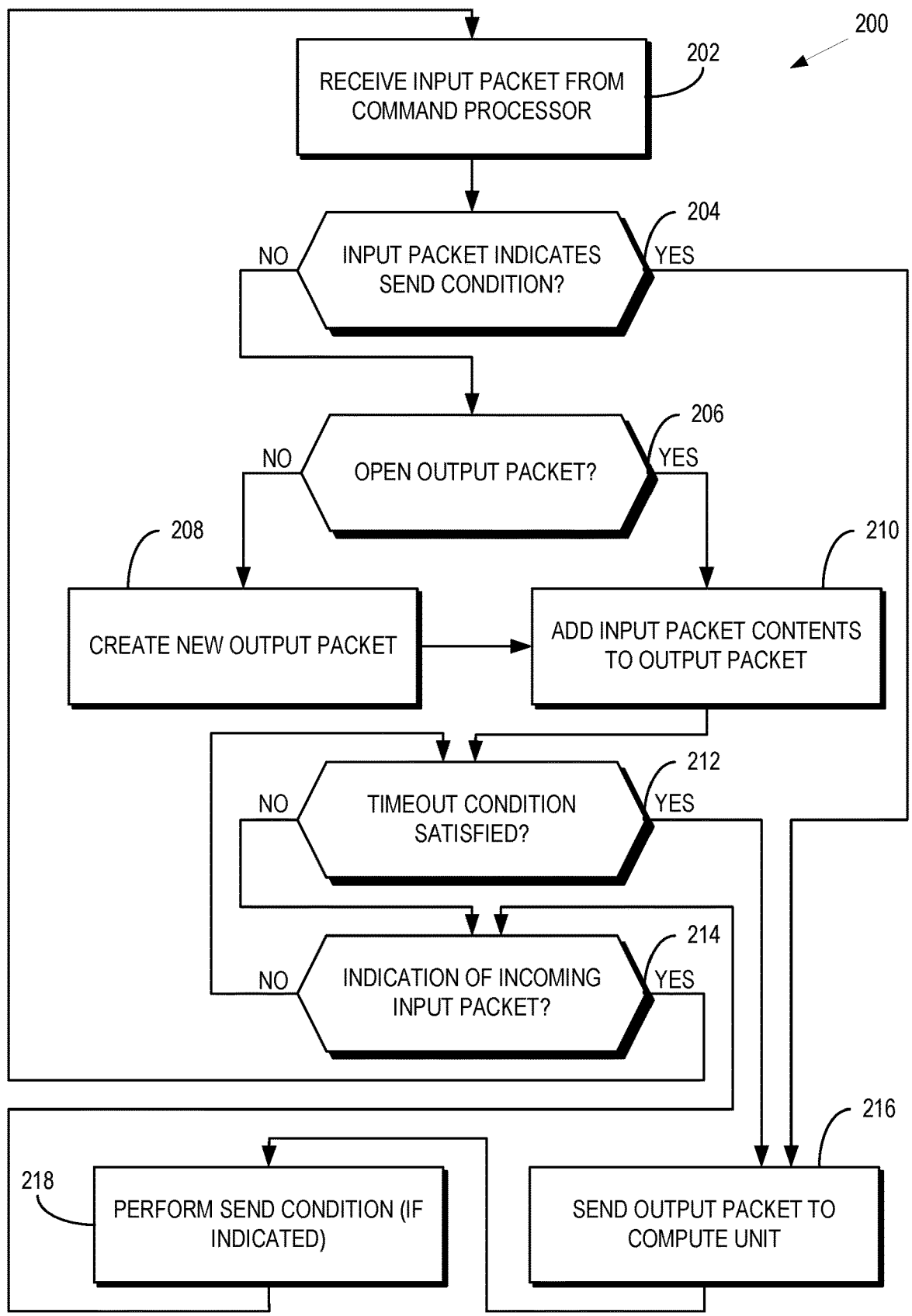
FIG. 2 is a flow diagram illustrating a method of aggregating data from input packets in accordance with some embodiments.

FIG. 2 is a flow diagram illustrating a method 200 of aggregating data from input packets in accordance with some embodiments. The method 200 is implemented, in some embodiments, by packet management component 104 of GPU 100 of FIG. 1. In some embodiments, method 200 is initiated by one or more processors in response to one or more instructions stored by a computer-readable storage medium.

At 202, method 200 includes receiving an input packet from a command processor. For example, in some cases, packet management component 104 receives input packet 130 from command processor 102.

At 204, method 200 includes determining whether the input packet indicates a send condition. For example, in some cases, packet management component 104 determines whether the received input packet 130 indicates (e.g., via state information) a send condition (e.g., a register state update or an event). In response to determining that the input packet indicates a send condition, method 200 proceeds to 216. In response to determining that the input packet does not indicate a send condition, method 200 proceeds to 206.

At 206, in response to determining that the input packet does not indicate a send condition, method 200 includes determining whether an output packet is open. For example, in some cases, packet management component 104 determines whether packet buffer 110 includes an open output packet. In response to determining that an output packet is open, method 200 proceeds to 210. In response to determining that no output packet is open, method 200 proceeds to 208.

At 208, in response to determining that no output packet is open, method 200 includes creating a new output packet. For example, in some cases, packet management component 104 creates a new output packet in packet buffer 110.

At 210, in response to determining that an output packet is open or subsequent to creating the new output packet, method 200 includes adding contents of the input packet to the output packet. For example, in some cases, packet management component 104 aggregates, in packet buffer 110, data corresponding to input packet 130 with data corresponding to one or more previously stored or otherwise held input packets. As another example, in some cases, packet management component 104 adds data corresponding to input packet 130 to the newly created output packet in packet buffer 110.

At 212, subsequent to adding the input packet contents to the output packet or in response to no indication of an incoming input packet, method 200 includes determining whether a timeout condition is satisfied. For example, in some cases, timeout detection component 122 checks a timeout storage tracker that indicates an amount of time at least a portion of the output packet has been stored or otherwise held at packet buffer 110. In response to the timeout storage tracker exceeding a timeout threshold, timeout detection component 122 determines that a timeout condition is satisfied. In response to determining that the timeout condition is satisfied, method 200 proceeds to 216. In response to the timeout storage tracker failing to exceed the timeout threshold, timeout detection component 122 determines that the timeout condition is not satisfied. In response to determining that the timeout condition is not satisfied, method 200 proceeds to 214. In some embodiments, 212 further includes determining whether a size of the output packet exceeds an output size threshold, and, in response to determining that the size of the output packet exceeds the output size threshold, proceeding to 216. In some embodiments, determining that the size of the output packet exceeds the output size threshold and proceeding to 216 is performed additionally or alternatively in other portions of method 200 including, for example, between 202 and 204.

At 214, in response to determining that a timeout condition is not satisfied or subsequent to sending the output packet and performing a send condition if one is indicated, method 200 includes determining whether an incoming input packet is indicated. For example, in some cases, packet management component 104 determines whether command processor 102 is sending an input packet. In response to detecting an incoming input packet, method 200 proceeds to 202. In response to failing to detect an input packet, method 200 proceeds to 212.

At 216, in response to determining that the input packet indicates a send condition or in response to determining that the timeout condition is satisfied, method 200 includes sending the output packet to a compute unit. For example, in some cases, in response to input packet 130 indicating a send condition, packet management component 104 closes the output packet and sends the output packet to compute unit 106 as output packet 132. As another example, in some cases, in response to timeout detection component 122 detecting that a timeout condition is satisfied, packet management component 104 closes the output packet and sends the output packet to compute unit 106 as output packet 132.

At 218, subsequent to sending the output packet to compute unit 106, method 200 includes performing a send condition if it is indicated (e.g., at 204). For example, in response to input packet 130 indicating a send condition, packet management component 104 sends output packet 132 to compute unit 106 and then performs the indicated send condition. Accordingly, a method of aggregating data from input packets is depicted.

Figure 3:
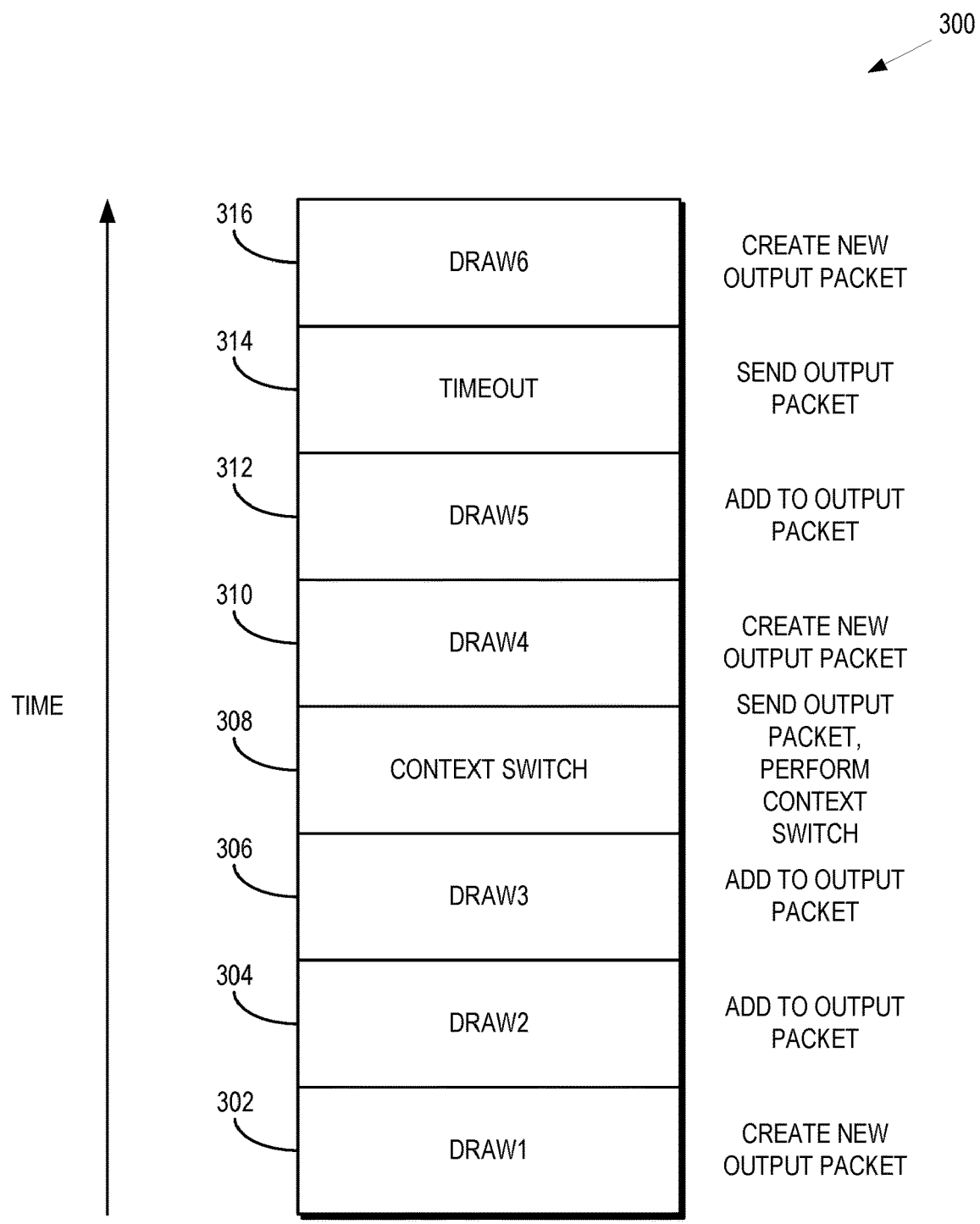
FIG. 3 is a block diagram illustrating an example packet management component processing an example timeline of input and output packets in accordance with some embodiments.

FIG. 3 is a block diagram depicting a timeline 300 that illustrates an example packet management component processing input and output packets in accordance with some embodiments. In the illustrated example, input packets 302-312 and 316 are received at a packet management component (e.g., packet management component 104). Further, event 314 is detected at the packet management component.

To illustrate, in response to receiving input packet 302, a new output packet is created and draw data (draw1) indicated by input packet 302 is added to the output packet. In response to receiving input packets 304 and 306, draw data (draw2 and draw3) indicated by input packets 304 and 306 are aggregated with the draw data indicated by input packet 302. Input packet 308 indicates a context switch (a send condition). In the illustrated example, input packet 308 indicates that input packets 302-306 correspond to a different context than subsequently received input packets 310 and 312. Accordingly, in response to detecting the send condition, the output packet including the draw data indicated by input packets 302-306 is sent and then the context switch is performed. In response to receiving input packet 310, a new output packet is created and draw data (draw4) indicated by input packet 310 is added to the output packet. In response to receiving input packet 312, draw data (draw5) indicated by input packet 312 is added to the output packet. In the illustrated example, at 314, a timeout detection component detects that a package storage timer indicates that at least a portion of the data in the output packet (e.g., the draw data indicated by input packet 310) has been stored for longer than a timeout threshold. Accordingly, at event 314, a timeout condition is satisfied and the output packet including the draw data indicated by input packets 310 and 312 is sent. In response to receiving input packet 316, a new output packet is created and draw data (draw6) indicated by input packet 316 is added to the output packet. Accordingly, an example timeline 300 of input and output packets is illustrated.

Figure 4:
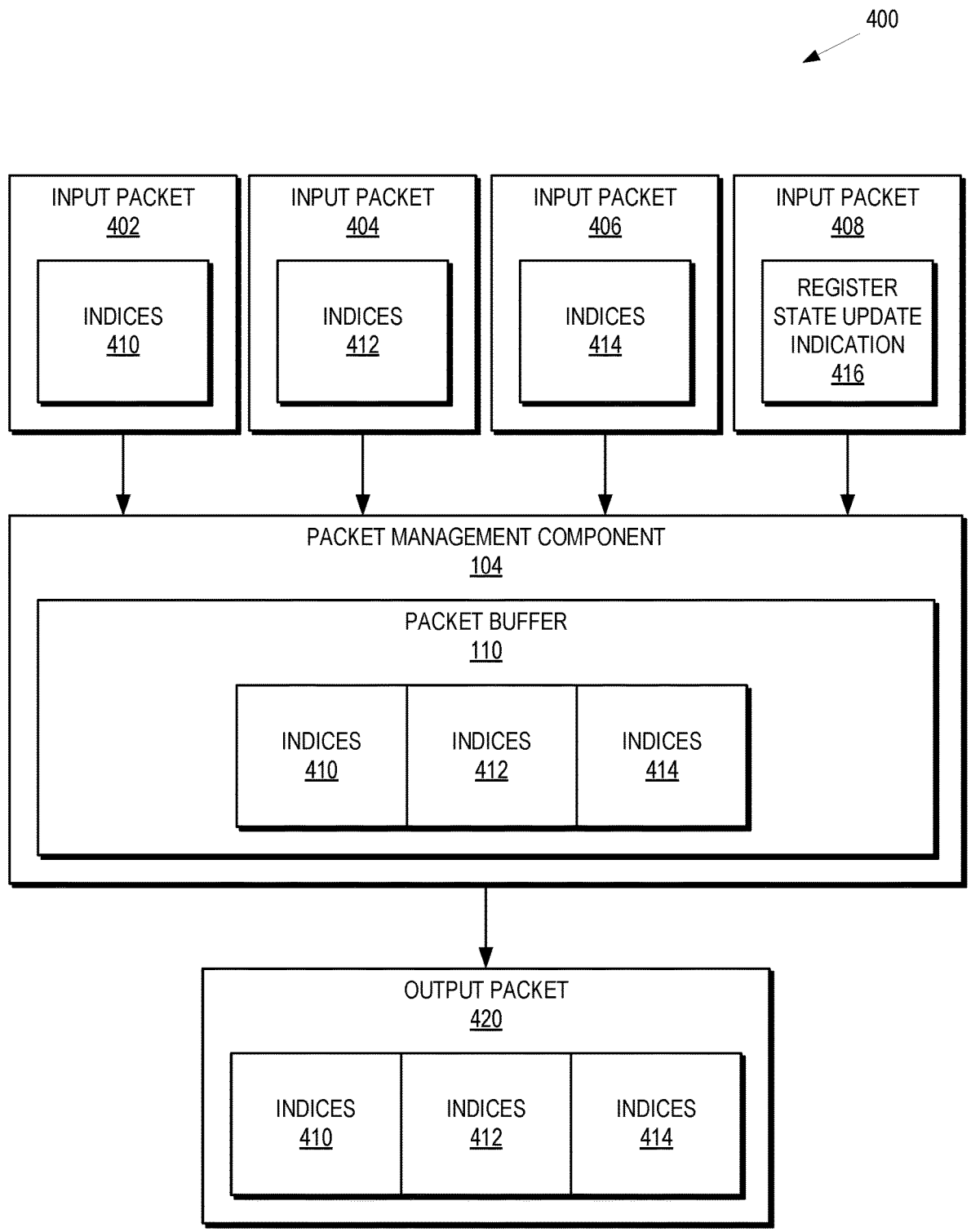
FIG. 4 is a block diagram illustrating an example packet management component aggregating indices from input packets and sending the indices in an output packet in accordance with some embodiments.

FIG. 4 is a block diagram illustrating an example GPU 400 that includes packet management component 104, which includes packet buffer 110 in accordance with some embodiments. In the example, packet management component 104 aggregates indices 410-414 from input packets 402-406 in packet buffer 110. As a result, indices 410-414 are aggregated and stored together in packet buffer 110. In the example, in response to a register state update indication 416 from input packet 408, packet management component 104 sends indices 410-414 in an output packet 420. In some embodiments, input packets 402-408 correspond to input packets 130 of FIG. 1 and output packet 420 corresponds to output packet 132 of FIG. 1.

In some embodiments, a computer readable storage medium includes any non-transitory storage medium, or combination of non-transitory storage media, accessible by a computer system during use to provide instructions and/or data to the computer system. In various embodiments, such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. In some embodiments, the software includes the instructions and certain data that, when executed by the one or more processors, manipulate the one or more processors to perform one or more aspects of the techniques described above. For example, in some cases, the non-transitory computer readable storage medium includes a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. A method, comprising:
receiving, by a packet management component from a command processor of a graphics processing unit (GPU), a first input packet indicating a first set of commands; and
in response to determining that the first input packet does not indicate a send condition, automatically aggregating data corresponding to the first input packet with previously received packet data stored at a packet buffer of the packet management component.

2. The method of claim 1, further comprising:
receiving a second input packet indicating a second set of commands received from the GPU;
in response to determining that the second input packet indicates a send condition, sending the aggregated data to a compute unit in an output packet; and
performing an operation indicated by the send condition.

3. The method of claim 2, wherein the first input packet includes a first plurality of draw indices, wherein the previously received packet data includes a second plurality of draw indices, and wherein the aggregated data includes the first plurality of draw indices and the second plurality of draw indices.

4. The method of claim 3, wherein the output packet is a wavefront including a set of operations to be performed by the compute unit of the GPU.

5. The method of claim 2, wherein the second input packet indicates at least one of a register state update, a context switch, or a pipeline flush.

6. The method of claim 2, further comprising:
subsequent to performing the operation, receiving a third input packet indicating a third set of commands received from the GPU;
storing data corresponding to the third input packet at the packet buffer; and
in response to detecting that a timeout condition has been satisfied, sending the third input packet to the compute unit in a second output packet.

7. The method of claim 2, further comprising:
subsequent to performing the operation, receiving a third input packet indicating a third set of commands received from the GPU;
storing data corresponding to the third input packet at the packet buffer; and in response to detecting that an amount of second aggregated data stored at the packet buffer exceeds an output size threshold, sending the third input packet to the compute unit in a second output packet.

8. The method of claim 7, wherein the output size threshold is user programmable.

9. A graphics processing unit (GPU), comprising:
a command processor configured to send input packets indicating commands received from the GPU; and
a packet management component, comprising:
a packet buffer configured to store data corresponding to the input packets received from the command processor; and
a packet aggregation component configured to:
identify state information of an incoming first input packet;
in response to the state information indicating an aggregation condition, aggregate data corresponding to the first input packet with data corresponding to a second input packet stored at the packet buffer; and
in response to the state information indicating a send condition, send an output packet for processing by a compute unit, wherein the output packet includes aggregated data stored at the packet buffer.

10. The GPU of claim 9, wherein the packet aggregation component comprises a timeout detection component configured to cause the output packet to be sent in response to an amount of time at least a portion of the data corresponding to the second input packet has been stored exceeding a timeout threshold.

11. The GPU of claim 10, wherein the timeout threshold is user-specified.

12. The GPU of claim 9, wherein the output packet is a wavefront.

13. The GPU of claim 9, wherein the aggregated data includes a portion of the first input packet and a portion of the second input packet.

14. The GPU of claim 9, wherein the aggregated data includes the first input packet and the second input packet.

15. A method, comprising:
receiving, by a packet management component from a command processor, a first input packet indicating a first set of commands received from a graphics processing unit (GPU);
storing data corresponding to the first input packet at a packet buffer of the packet management component;
receiving a second input packet indicating a second set of commands received from the GPU;
in response to determining that an output condition has not been satisfied, automatically aggregating data corresponding to the second input packet with the data corresponding to the first input packet; and
in response to determining that an output condition has been satisfied, sending the aggregated data to one or more compute units in one or more output packets.

16. The method of claim 15, wherein determining that the output condition has been satisfied is performed in response to determining that an amount of the aggregated data stored at the packet buffer exceeds an output size threshold.

17. The method of claim 15, wherein determining that the output condition has been satisfied comprises determining that a third input packet indicates a send condition.

18. The method of claim 15, further comprising, in response to receiving the first input packet, starting, at a timeout detection component of the packet management component, a packet storage timer.

19. The method of claim 18, wherein determining that the output condition has been satisfied comprises determining that the packet storage timer exceeds a timeout threshold.

20. The method of claim 19, wherein the timeout threshold is user-specified.

* * * * *